(12) United States Patent
Bondestam

(10) Patent No.: US 11,840,999 B2
(45) Date of Patent: Dec. 12, 2023

(54) ROTOR

(71) Applicant: Marten Bondestam, Luoma (FI)

(72) Inventor: Marten Bondestam, Luoma (FI)

( * ) Notice: Subject to any disclaimer, the term of this patent is extended or adjusted under 35 U.S.C. 154(b) by 0 days.

(21) Appl. No.: 16/972,698

(22) PCT Filed: May 22, 2019

(86) PCT No.: PCT/FI2019/000008
§ 371 (c)(1),
(2) Date: Dec. 7, 2020

(87) PCT Pub. No.: WO2019/234287
PCT Pub. Date: Dec. 12, 2019

(65) Prior Publication Data
US 2021/0254594 A1    Aug. 19, 2021

(30) Foreign Application Priority Data

Jun. 6, 2018 (FI) .................................. 20187080

(51) Int. Cl.
*F03D 1/06* (2006.01)
*F03B 3/12* (2006.01)
*F03B 17/06* (2006.01)

(52) U.S. Cl.
CPC .......... *F03B 3/126* (2013.01); *F03B 17/061* (2013.01); *F03D 1/0625* (2013.01); *F05B 2210/16* (2013.01); *F05B 2240/311* (2013.01); *F05B 2250/232* (2013.01); *F05B 2250/73* (2013.01)

(58) Field of Classification Search
CPC ... F03B 3/126; F03D 1/0625; F05B 2240/311
See application file for complete search history.

(56) References Cited

U.S. PATENT DOCUMENTS

| 802,144 | A | | 10/1905 | Harrington | |
|---|---|---|---|---|---|
| 1,024,700 | A | * | 4/1912 | Rikhoff | B64C 11/006 416/109 |
| 2,633,921 | A | * | 4/1953 | Monney | F03D 1/0608 416/135 |
| 4,191,507 | A | * | 3/1980 | DeBerg | F03D 3/067 416/117 |
| 4,681,512 | A | * | 7/1987 | Barnard | F03D 3/067 416/117 |
| 5,823,749 | A | * | 10/1998 | Green | F03D 3/067 416/132 B |
| 6,099,256 | A | * | 8/2000 | Silvano | F04D 29/325 29/889.6 |
| 6,948,910 | B2 | * | 9/2005 | Polacsek | F03D 1/0608 416/227 R |

(Continued)

FOREIGN PATENT DOCUMENTS

FR    2609506 A1 *   7/1988    ........... F03D 1/0608

OTHER PUBLICATIONS

International Search Report, Application No. PCT/FI2019/000008, dated Sep. 6, 2019, 3 pages.

*Primary Examiner* — Justin D Seabe
(74) *Attorney, Agent, or Firm* — Ziegler IP Law Group

(57) ABSTRACT

A rotor including soft rotor structures fixed to the rotor shaft, which rotor structures are of a soft material such as canvas or the like. The rotor structure is a loop arranged to form an asymmetrical cone when an air or water current flows through the loop.

8 Claims, 4 Drawing Sheets

(56) References Cited

U.S. PATENT DOCUMENTS

| | | | |
|---|---|---|---|
| 7,448,337 B1* | 11/2008 | King | F03D 1/0633 |
| | | | 114/102.1 |
| 9,926,058 B2* | 3/2018 | Sharrow | B64C 11/20 |
| 11,067,055 B2* | 7/2021 | Saiz | F03D 1/06 |
| 2007/0189899 A1* | 8/2007 | Serpa | F03D 3/061 |
| | | | 416/132 B |
| 2014/0161622 A1* | 6/2014 | Sharrow | F01D 5/141 |
| | | | 29/889.6 |

* cited by examiner

ROTOR

The aspects of the disclosed embodiments relate to a rotor consisting of canvas-like, wide loops which are connected to a rotor shaft and which form asymmetric, bag-like cones under the effect of wind or water currents.

FIELD

Multiple types of oceanic turbines have been devised and constructed. Such turbines comprise a rotor or rotor-like parts. In this context, the rotating part of the turbine is referred to as the rotor and the turbine blades are called vanes. Prior art turbines use a hard material, such as steel as the vane material. They are also provided with a gear system, which adapts the rotation speed of the rotor to electricity production. These rotors are intended to produce electricity. These rotors have been observed to harm animals, such as fish, and for some reason they also generate harmful noise. Consequently, prohibition of these rotors has been suggested. Large rotors reduce sea currents in the oceans. When placed in wrong places, they may reduce the stream of important oceanic currents, thus worsening the climate. If a specific model has a low harmful impact on marine animals, it can be used in tidal currents. There are previously known ventilating rotors made of rubber, which are still sufficiently hard not to be deformed during rotation. They are completely soundless.

Because marine rotors made of a hard material harm marine life, rotors equipped with a protective net have been developed. Marine animals may still get caught in the protective net and be injured. This led us to the idea of a soft rotor. In the rotor field this is an unusual concept. By contrast, many types of soft constructions have been developed in the kite field.

BASIC IDEA OF THE PRESENT DISCLOSURE

In ancient times, people used multi-masted sailing ships. The vast sailing areas of these ships were based on the properties of the canvas. The construction of wind turbines aims at large units, operating on the same logics as sailing ships. There are known conical weather vanes and also conical very large kites. By utilising the shaping force of the wind or water currents, one can achieve an efficient rotor without other support structures than those used for attaching the moving canvas to the rotor shaft.

The characteristics of the rotor in accordance with the disclosed embodiments are defined in the claims.

The rotor vane of this application consists of a wide canvas loop. In a simple version, the loop-shaped vane resembles a cornet. The cornet is similar to a wind cone, through which the wind blows while the conical shape maintains its tension. When the rotor shaft is obliquely connected to this cone, a rotor-like rotation is generated. There are previously known conical kites, which remain stiff under the pressure produced inside by the wind. These flying wind cones have been examined, and they have been observed to generate a force that lifts three kites. The air current arriving obliquely from the lower side generates lifting. The air current directed to the upper side of the cone curves, so that an upward suction effect similar to aircraft wings is produced. The air jet passing through the obliquely downwards directed hole of the cone lifts the kite. The same factors work in water. Rotors have been tested both in water and in air. Rotors apparently have a market and are potentially useful in solving climate problems.

The rotor of the disclosed embodiments does not harm marine animals when used as a marine rotor or an ordinary rotor. When used as a wind turbine, it does not harm birds or humans. A rotor is soundless both in water and air. A rotor can be less expensive than hard rotors and also have much smaller weight. The rotor vanes in the shape of a canvas loop can be stacked on a flat plane and are thus easy to transport. The rotor can be manufactured with extremely light weight and can thus operate in thin air or in any thin gas.

The aspects of the disclosed embodiments are described below with the aid of examples and with reference to the accompanying drawings, in which.

TIDAL POWER PLANTS

Figure 1:
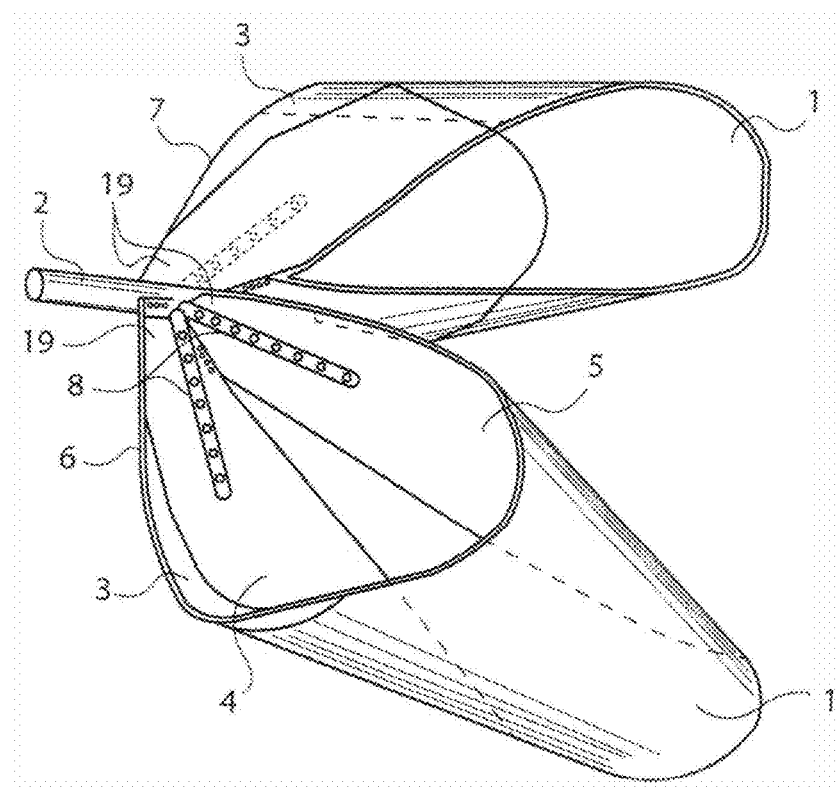
FIG. 1 is a lateral view of the rotor.
Figure 2:
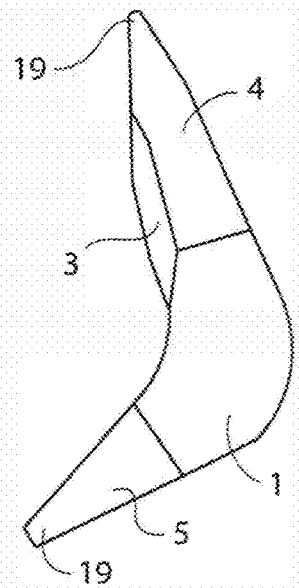
FIG. 2 is a top view of the rotor loop on a flat substrate.
Figure 3:
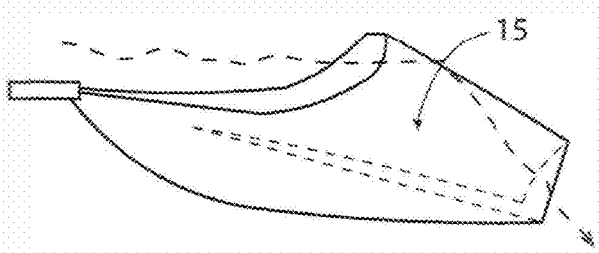
FIG. 3 is a lateral view of the rotor with a water current passing through the vane.

In this case, the rotor operates under the water or in the air. The rotor vanes are partly cones (15). Since the central part (1) of the cone (15) is oblique with regard to the sea current, the cone starts rotating around the shaft (2). For power production in the shaft (2), one side (4) of the cone (15) is larger and/or in a steeper angle to the propeller shaft (2). This is shown as a surface (3) in the figure. This makes the cone (15) withdraw outwards from the shaft (2). The conical loop (16) has a left and a right part (4) and (5). For the power from the soft cone (15) to be transmitted to the shaft (2), the parts (4) and (5) have reinforcements (8) and (9) which are solidly fixed to the shaft. The reinforcements (4) and (5) may have various shapes. A canvas or any similar soft material is attached to the reinforcements. They are at a distance from the front edges (6) and (7). The cone (1) proper may be sufficiently stiff under the water current so that no reinforcements will be necessary. The canvas proper or a similar material may be fixed with rivets or similar means to the shaft, being positioned against the shaft. The water current stiffens the cone, without making it hard. The rotor may have two or more vanes. The vane is partly a cone (15). A model with two vanes may be the most convenient solution. A model with three vanes equalizes the currents hitting the vanes and is thus used in wind turbines. Any marine animal or fish or other animal hitting the cone would not be injured. The canvas or any similar cone material can be mounted on the plane surface. This is illustrated in FIG. 2. Consequently, during the transport of the rotor to the site of operation, the cone canvases can be stacked and are thus space-saving.

Figure 4:
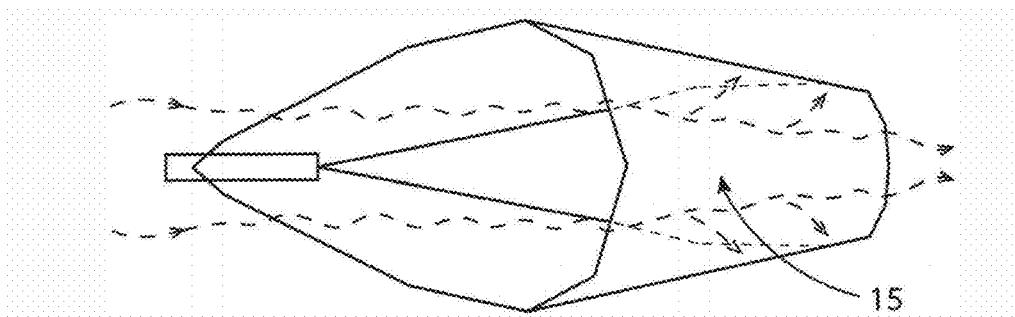
FIG. 4 is a top view of the same as FIG. 3.
Figure 5:
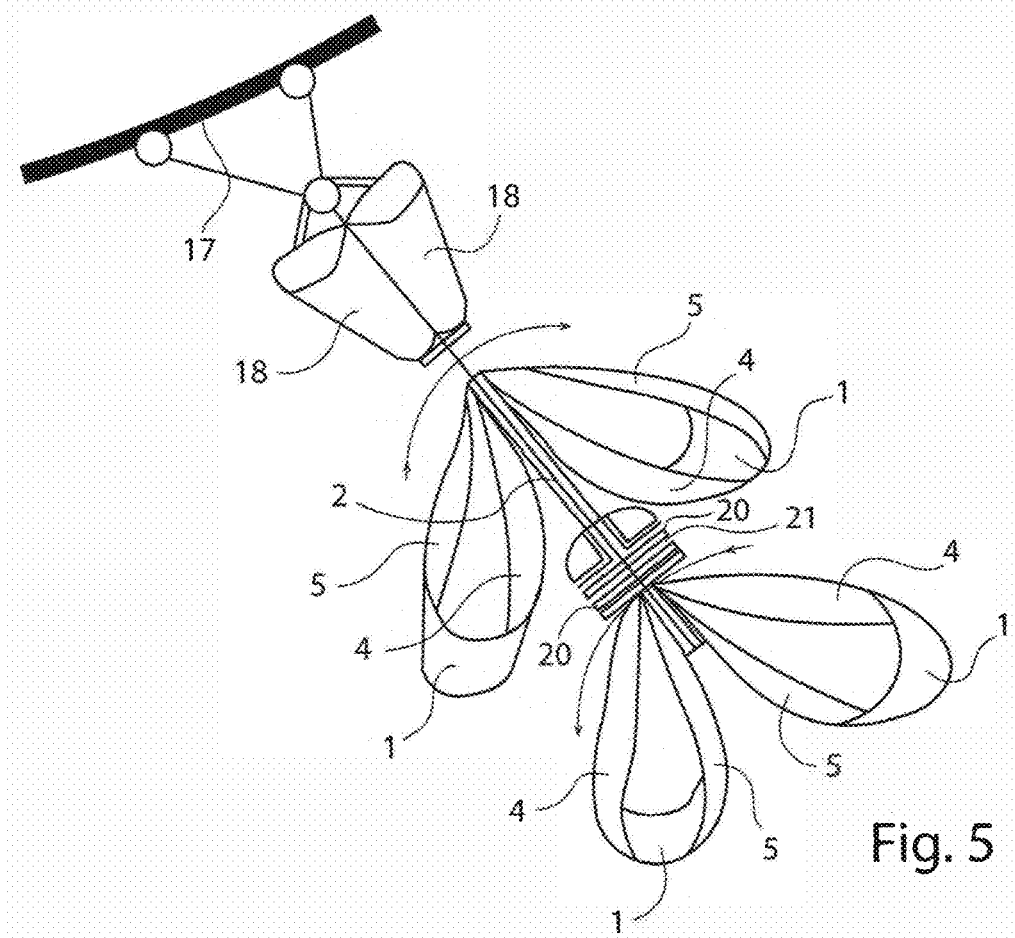
FIG. 5 is a lateral view of an example of the use of the rotor in the ocean.

FIGS. 4 and 5 illustrate an example of a device in which two rotors of the present disclosure are placed on the same shaft in succession but in opposite directions of rotation. The end of the shaft is connected to a wire (17) or the like. The rotors tend to rotate in opposite directions, and then the central shaft (2) does not rotate. Rotation of the wire (17) may also be prevented by various devices. In the figure, the angles of the two cones (18) shift immediately if the shaft (2) rotates slightly, thus preventing additional rotation. The exemplified device comprises two dynamos with their stator (21) including coils connected to the central shaft (2). Permanent magnets (20) are connected to the rotors. In such a construction, the conducts from the stator (19) do not require any slide contact. It is also possible to install permanent magnets (20) so as to produce several electric impulses during each rotation without using any gear system. FIG. 5 shows such a device. Local currents in the oceans can be extremely strong.

Thus, for instance, off the coast of Tierra del Fuego, the water stream per hour is 100 times as strong as the total of the rivers of the entire planet. Electricity generated in this manner can prevent the climate change.

Wind Turbines

Figure 6:
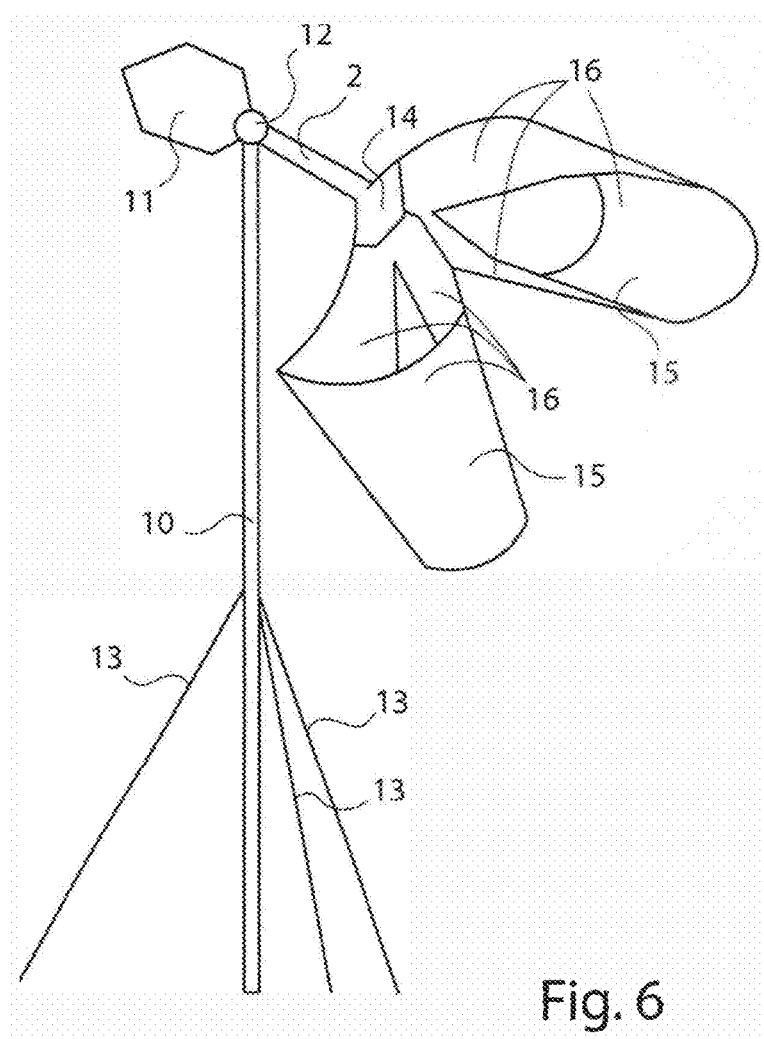
FIG. 6 is a lateral view of the use of the rotor in a wind turbine.

The rotor can also be used in wind turbines—as in FIG. 6. Wind turbines of a suitable size can be mounted in half an hour. It is also easy to transport. Operating in the air, it causes no noise. It can thus be placed in the neighbourhood of housing areas. Operating in the air, it would not be harmful to the environment, should the rotor break, since the canvas stripes hang down from the device, and should they come off, they are soft. This involves a great advantage, as the wind turbine can be placed near populated areas. The rotor has a softer shape than hard rotors and might have a more agreeable and less technical aspect. In FIG. 6, a rod (10) maintains the wind turbine in the air by means of joints (12), so that the device can rotate under the wind and oscillate also vertically. The joint has a drag for electricity transmission. The cones (15) integrated in the loops (16) rotate around the shaft (2) and are connected to this in a manner (14) allowing wind power to be transmitted to the shaft (2), which rotates an ordinary electric generator (11). Under excessively hard winds, the geometry of the cones (15) allows the vanes to deform and flatten so that the device as a whole remains intact.

Propeller of a Ship

This rotor can be adapted for installation as the propeller of a ship. This reduces the harmful effects of ships, such as injuries to animals and noise that disturbs animals. When used as the propeller of a ship, the cones shall be connected to the shaft at the other end as well, because the cone tends to move into a direction opposite to that of a marine power plant, for instance.

Rotor of a Helicopter

Owing to the extremely light weight and the noiselessness of the rotor of the invention made of canvas or having a similar design, it is apt for use as a rotor of a helicopter.

Rotor of an Autogyro

The rotor is apt for use in an autogyro. An autogyro is like a helicopter, but the wind generated by the forward movement of the engine makes the rotor rotate. This yield benefits of the same type as those of a helicopter.

Rotor of a Fan

There are various types of fans. There are noiseless fans equipped with a rubber-like rotor. Being simple and having a straightforward construction, the rotor of the disclosed embodiments is thus suitable for use with an inexpensive fan. It does not require any protective net because its soft material causes no damage. A lifting rotor is well adapted for use in a helicopter flying in thin atmosphere. Since the rotor of the disclosed embodiments can be manufactured with a very light weight and a large size, it seems possible to manufacture a flying device which flies in thin air or any other gas. It could fly to the stratosphere or on Mars.

Rotor of Hovercraft

Rotors are the weak point of hovercraft. Light weight and high effect is required of such rotors. The rotor of the disclosed embodiments can be manufactured with precisely these properties.

Large-Sized Propeller for Slow Sea Currents

The aspects of the disclosed embodiments are suitable for use in exploitation of a large slow sea current in the production of electricity or it can be used to stop a sea current. There are probably sea currents that are harmful to the climate. A device similar to a rotor can be used for acting on such sea currents. The Greenland current, which stops the Golf stream, could thus be diminished and the Golf stream could be recovered, while generating electricity for Greenland, for instance.

Parachute

A parachute which can be knocked down into a small space and forms the two-vane rotor of the disclosed embodiments when opened. When rotating, it equals a parachute of much larger size. There can be two rotors rotating into mutually opposite directions. There can also be a plurality of vanes if this is an advantage.

Rotor Producing Rain

When the rotor cones are lifted high up in the air by means of a kite, a kytoon or a mast, they condense humid air into rain. The device can comprise some kind of cooling contributing to condensation.

The invention claimed is:

1. A rotor comprising:
soft rotor structures fixed to a rotor shaft, which soft rotor structures are of a soft material,
wherein each of the soft rotor structures forms a modified conical cylinder when an air or water current flows through the each of the soft rotor structures, wherein the modified conical cylinder is asymmetrical when viewed in a lateral side view and has a first side and a second side downstream of the first side, and wherein the first side and the second side are oblique to each other when viewed in the lateral side view and
wherein the modified conical cylinder further has a lateral side between the first side and the second side, the lateral side being continuous so that the lateral side forms a loop, part of the first side being attached to the rotor shaft.

2. The rotor according to claim 1, wherein the first side of the modified conical cylinder is larger than the second side.

3. The rotor according to claim 2, wherein the first side of the modified conical cylinder comprises at its front edge a surface that is arranged to form the first side of the modified conical cylinder.

4. The rotor according to claim 1, wherein a force of the modified conical cylinder is transmitted to the rotor shaft via reinforcements on the lateral side of the modified conical cylinder.

5. The rotor according to claim 1, wherein the modified conical cylinder is arranged to rotate the rotor shaft when the air or water current flows through the modified conical cylinder.

6. The rotor according to claim 1, wherein a force of the air or water current acting on the modified conical cylinder is arranged to be transmitted via the rotor shaft to an electric generator.

7. The rotor according to claim 1, wherein the soft material comprises canvas.

8. The rotor according to claim 1, wherein the soft rotor structures comprise a first group of soft rotor structures and a second group of soft rotor structures disposed downstream of the first group of soft rotor structures.

* * * * *